A. G. BOOZER, Jr. & G. HILL.
DOFFING MACHINE.
APPLICATION FILED SEPT. 13, 1912.

1,142,015.

Patented June 8, 1915.
19 SHEETS—SHEET 10.

Witnesses:
H. F. Tutt
C. Paul Parker

Inventors:
Arthur G. Boozer Jr.
George Hill.
By Luther L. Miller
Atty.

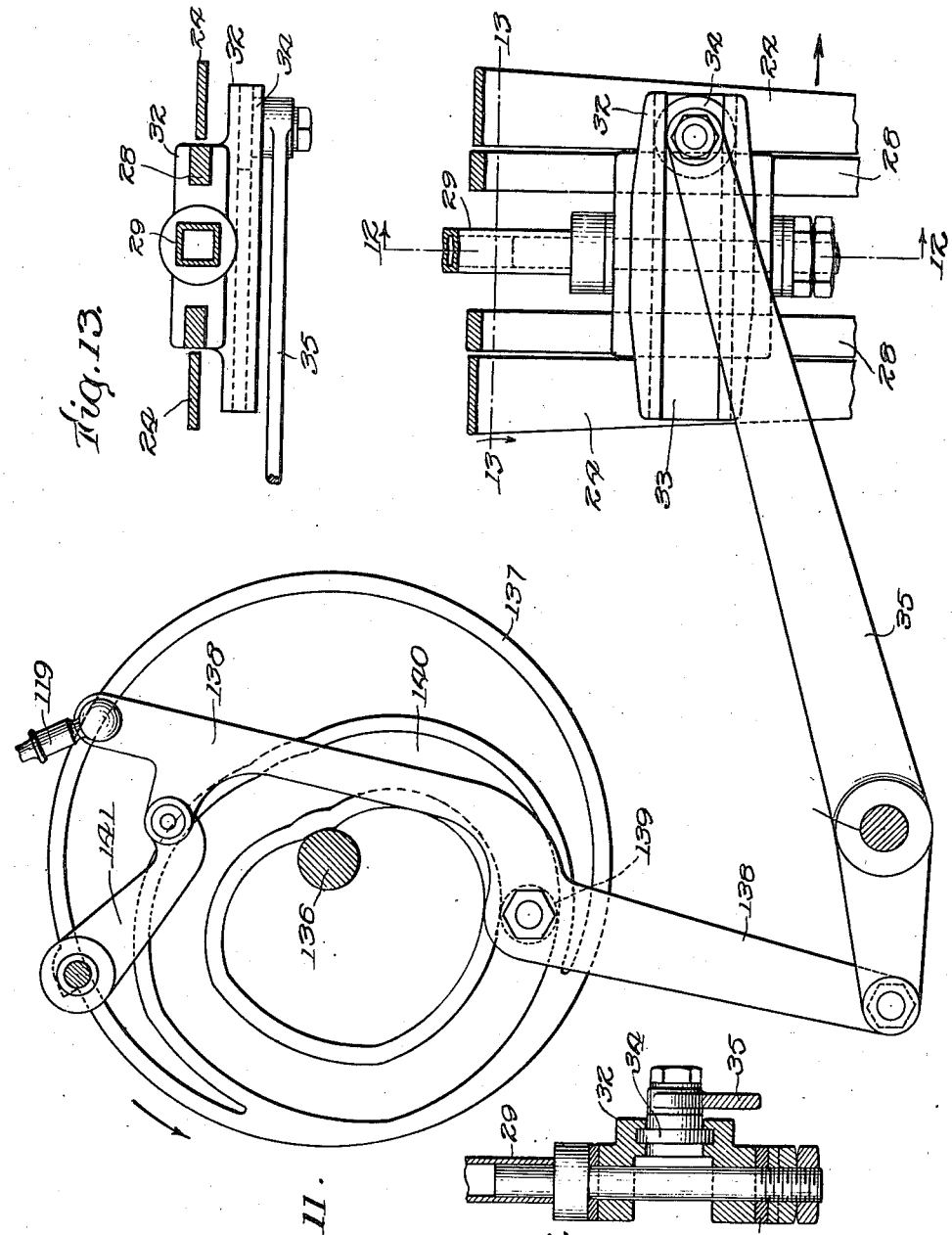

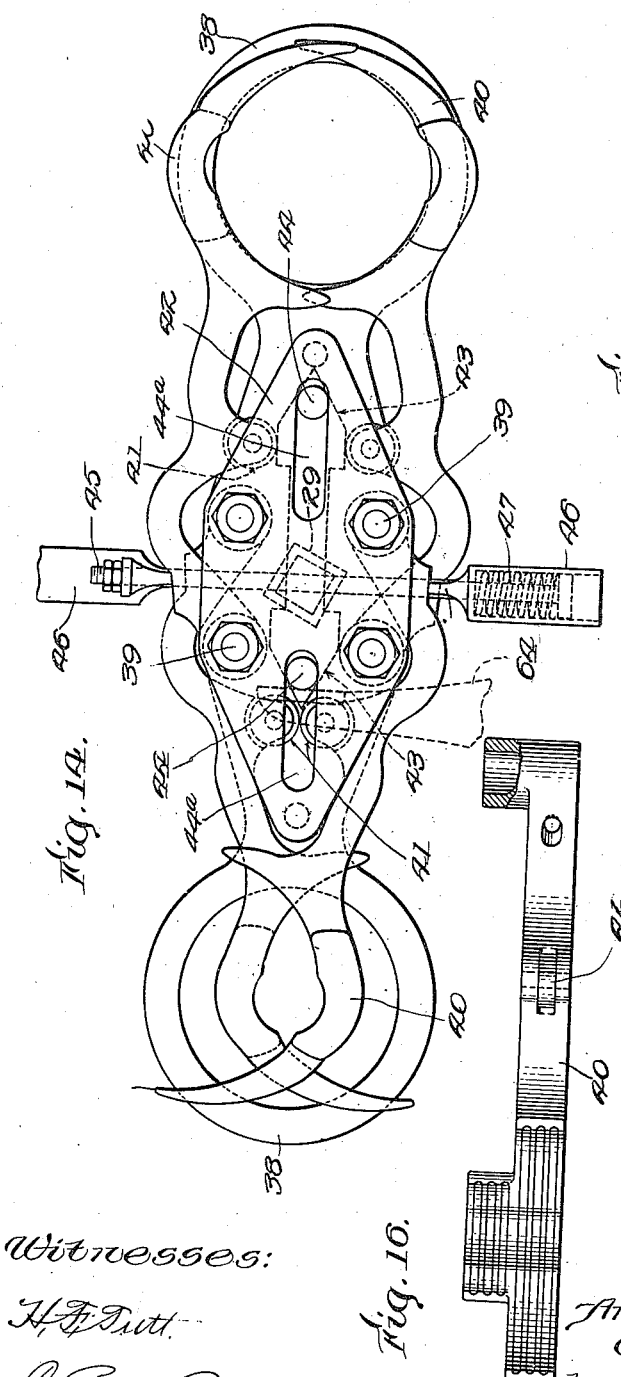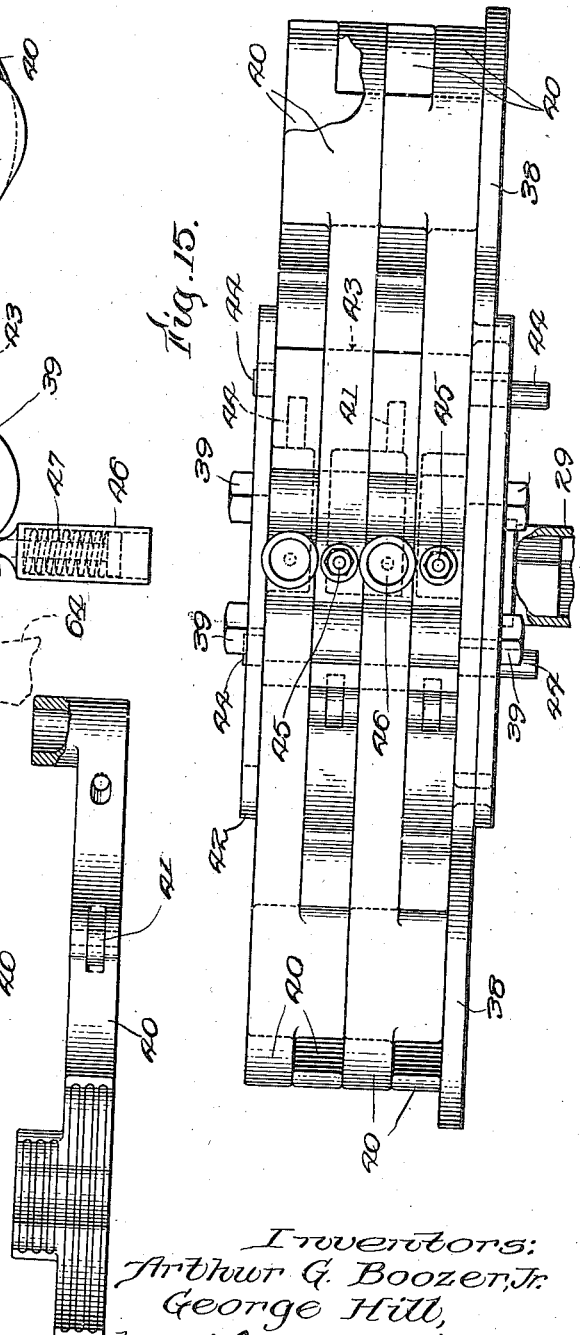

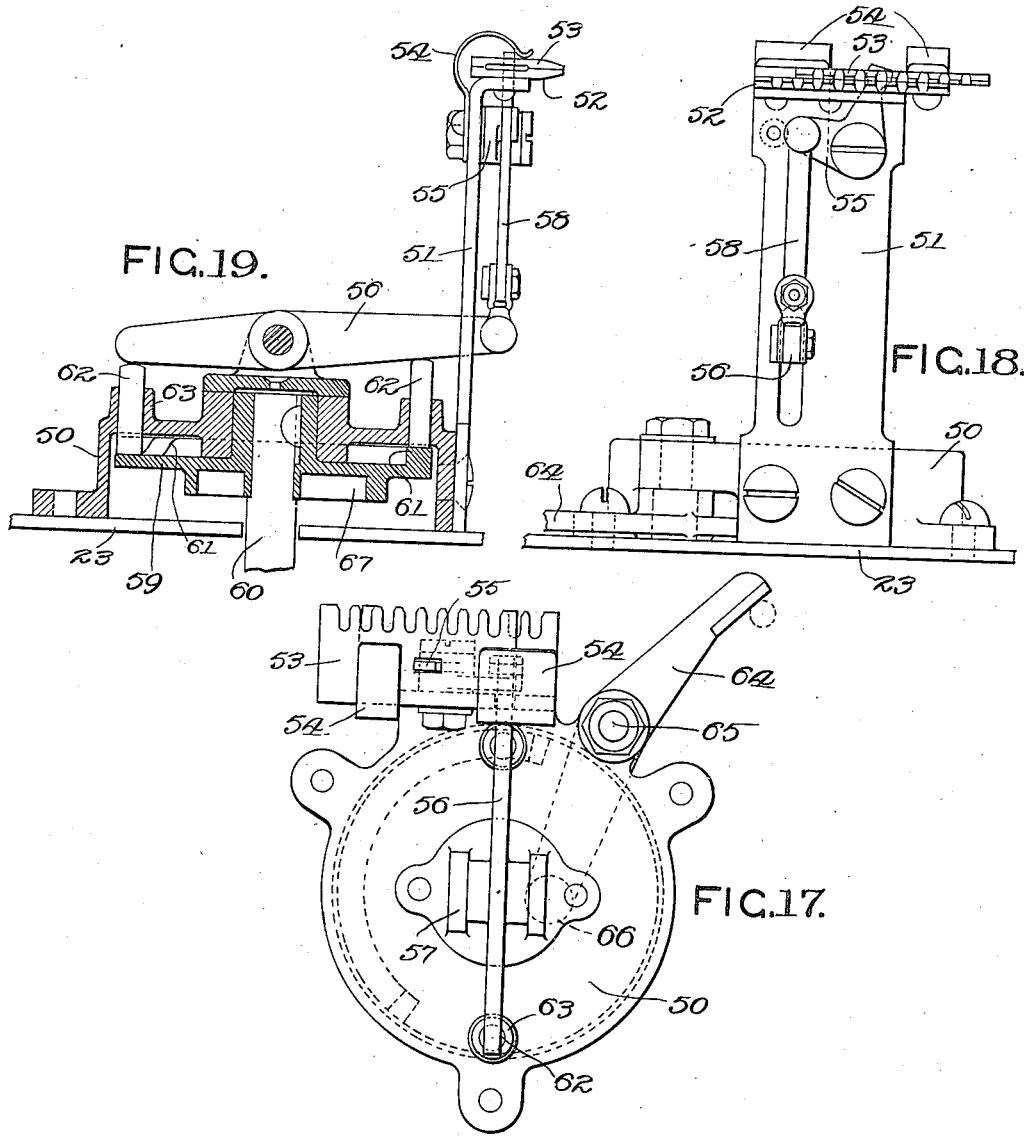

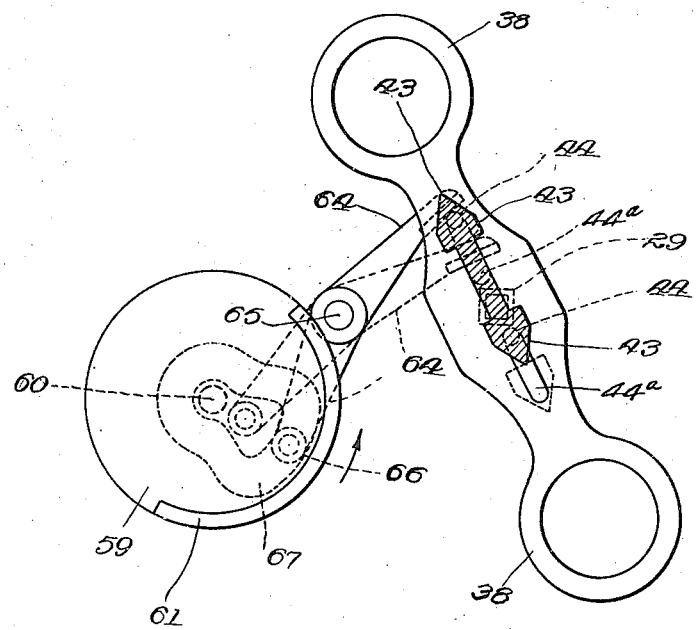

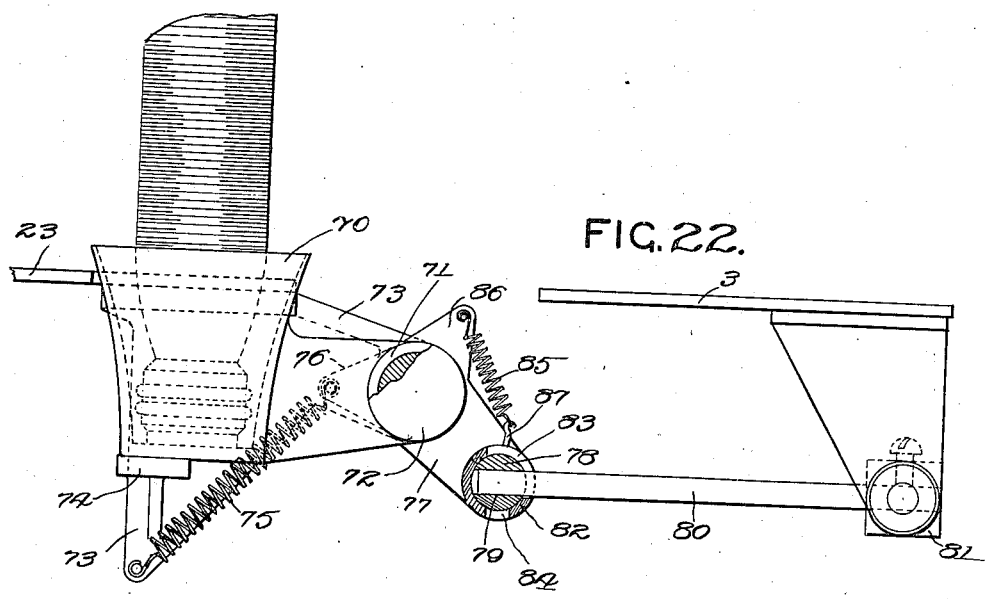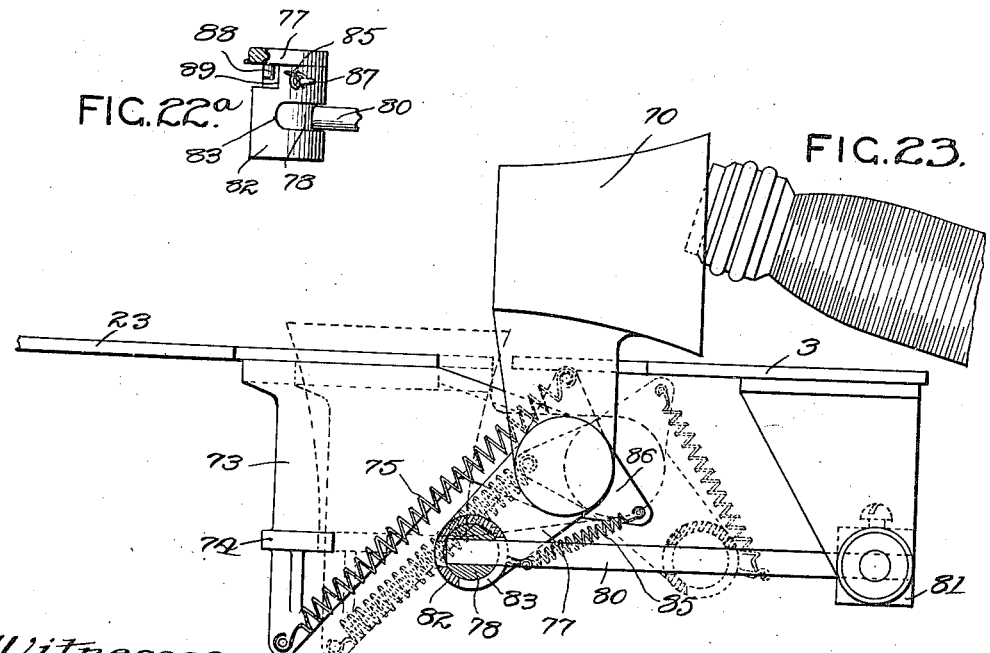

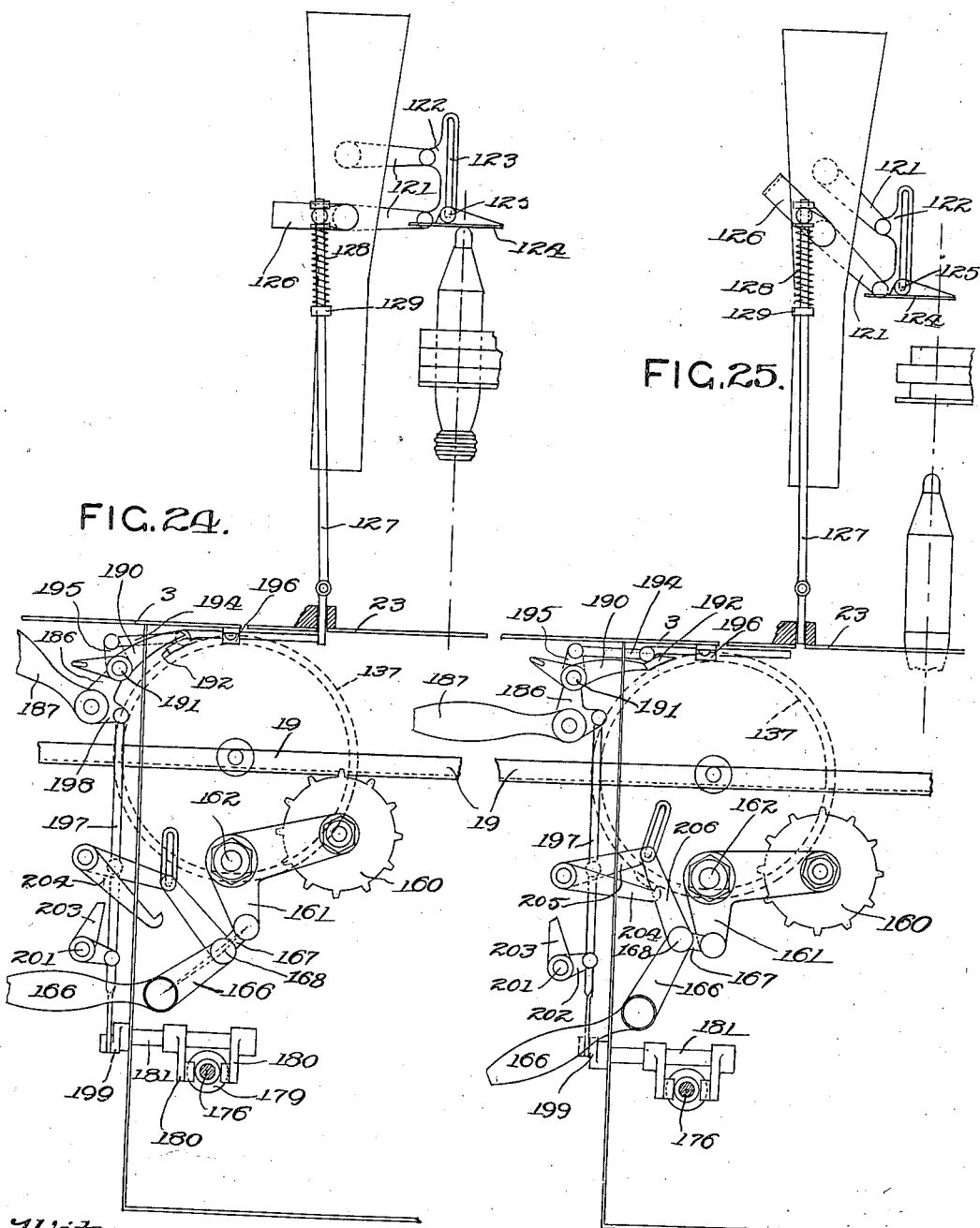

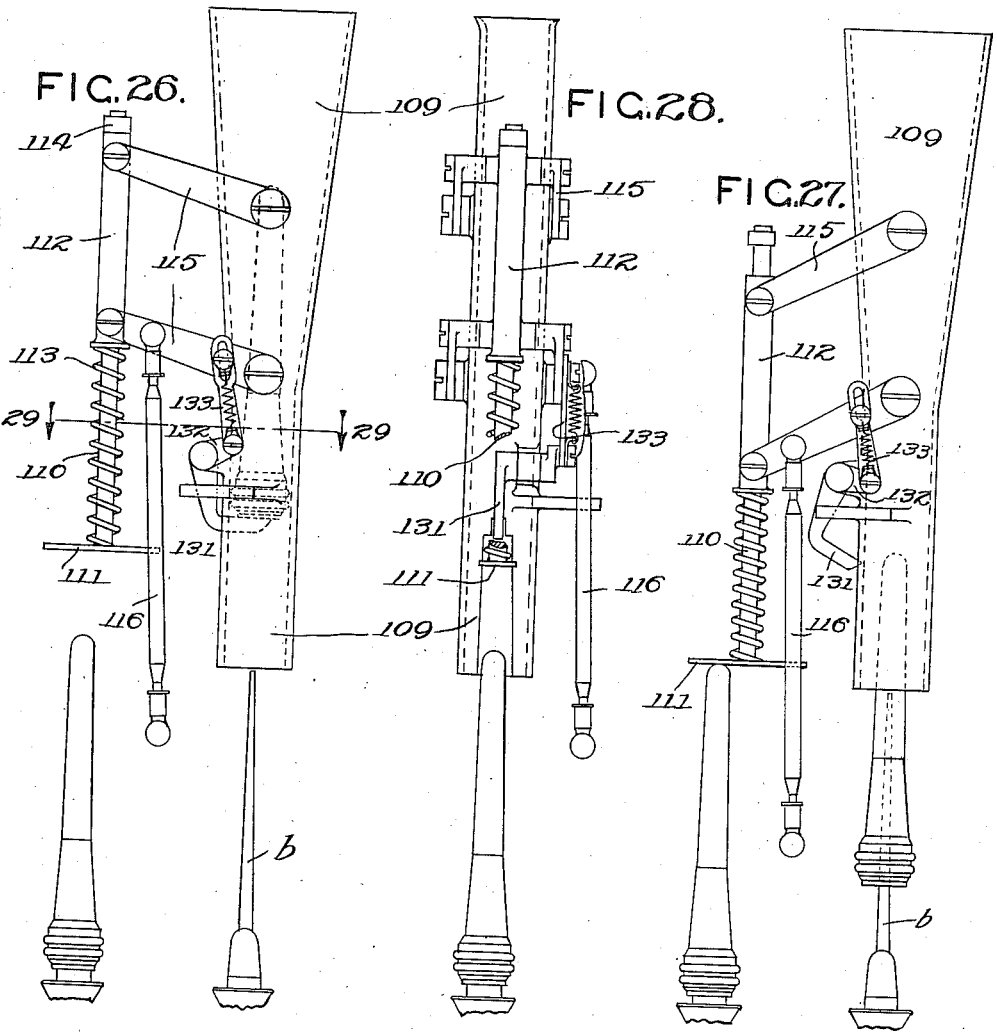

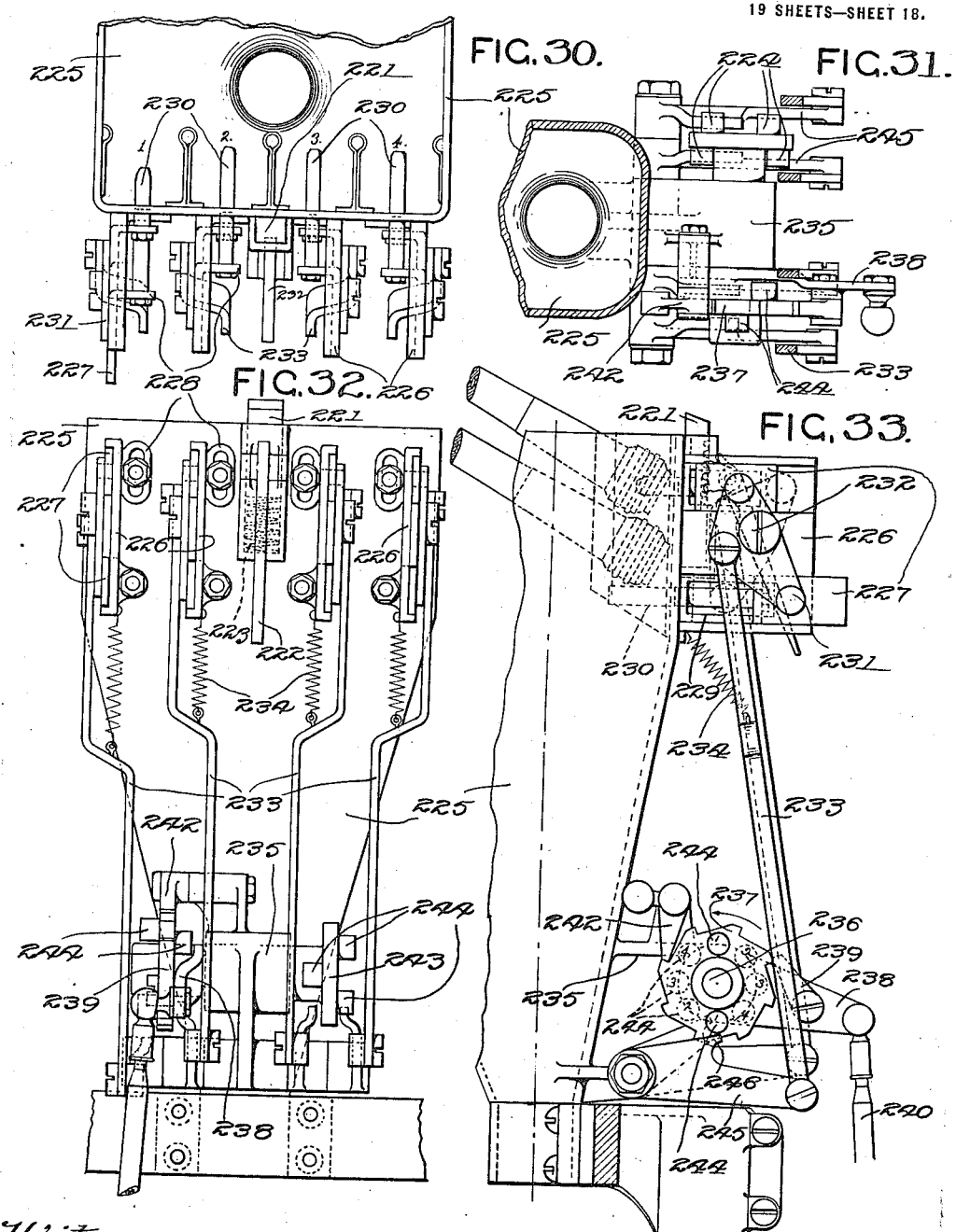

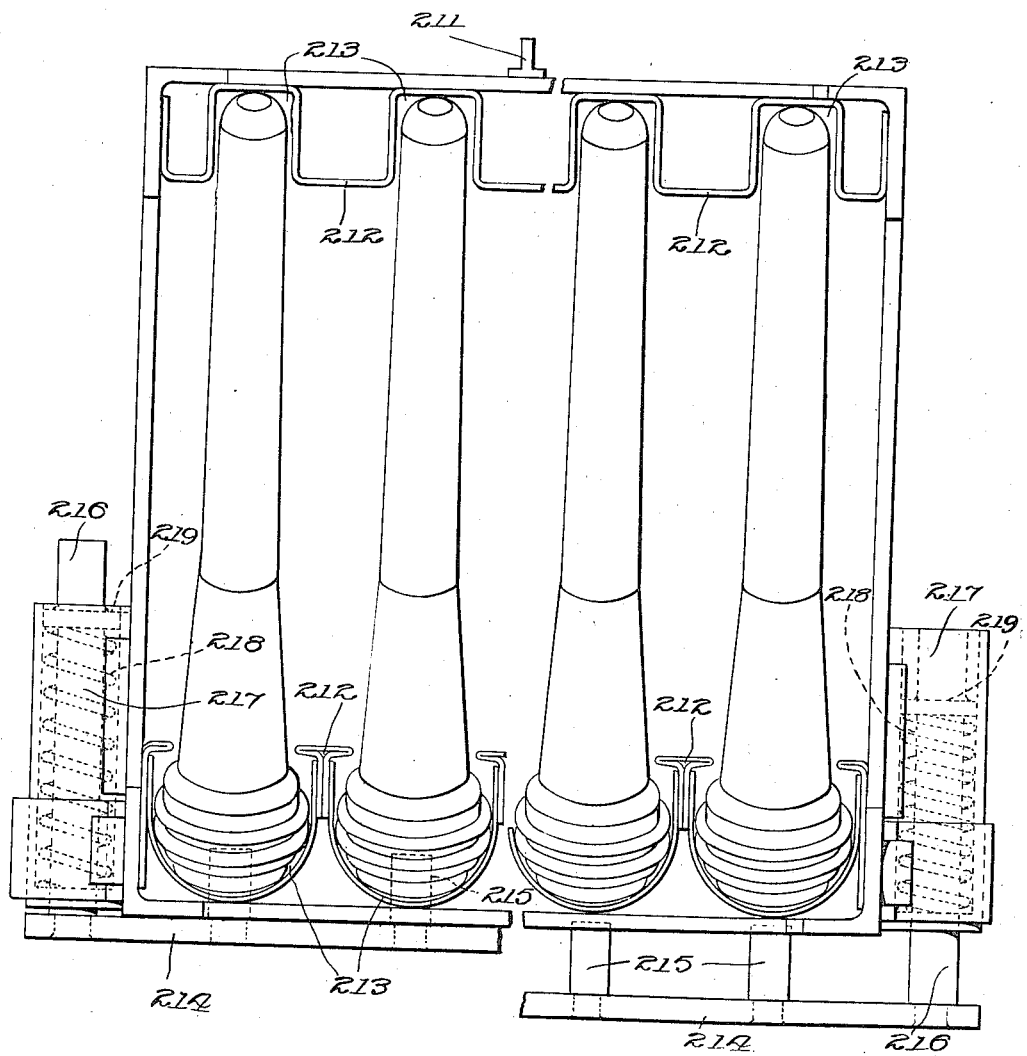

UNITED STATES PATENT OFFICE.

ARTHUR GEORGE BOOZER, JR., OF GREENVILLE, AND GEORGE HILL, OF TUCAPAU, SOUTH CAROLINA, ASSIGNORS TO HOWARD D. COLMAN, LUTHER L. MILLER, AND HARRY A. SEVERSON, COPARTNERS DOING BUSINESS AT ROCKFORD, ILLINOIS, AS BARBER-COLMAN COMPANY.

DOFFING-MACHINE.

1,142,015.   Specification of Letters Patent.   Patented June 8, 1915.

Application filed September 13, 1912. Serial No. 720,187.

*To all whom it may concern:*

Be it known that we, ARTHUR GEORGE BOOZER, Jr., and GEORGE HILL, citizens of the United States, residing, respectively, at Greenville, county of Greenville, and Tucapau, county of Spartanburg, in the State of South Carolina, have invented certain new and useful Improvements in Doffing-Machines, of which the following is a specification.

This invention relates to doffing machines arranged to travel along the sides of spinning machines for removing the full bobbins from the spindles and placing empty bobbins thereon.

The machine herein disclosed is of that type of doffer which comprises two relatively movable carriages, the one traveling at a constant speed along the spinning frame and the other carriage, which supports the doffing means, pausing before each spindle while a bobbin is being doffed and advancing intermittently the distance between successive spindles.

One of the objects of the invention is to produce a doffing machine which is operable at greater speed and is more economical of power than machines heretofore produced by us.

Another object is to produce means for transferring a doffed bobbin from the doffer head to a receptacle therefor.

Another object of our invention is to provide an improved construction in the doffer head and the means for operating same.

A further object is to improve the thread severing mechanism.

Another object is to provide improved means for seating the empty bobbins on the spindles.

A further object is to produce a mechanism operable when the bobbin is properly doffed to prevent the actuation of the throw-out mechanism.

The invention also relates to an improved magazine for empty bobbins and means for feeding the empty bobbins to the donning tube.

The invention further refers to the general improvement in the construction and operation of doffing machines with a view to producing a thoroughly efficient machine.

Figure 1:
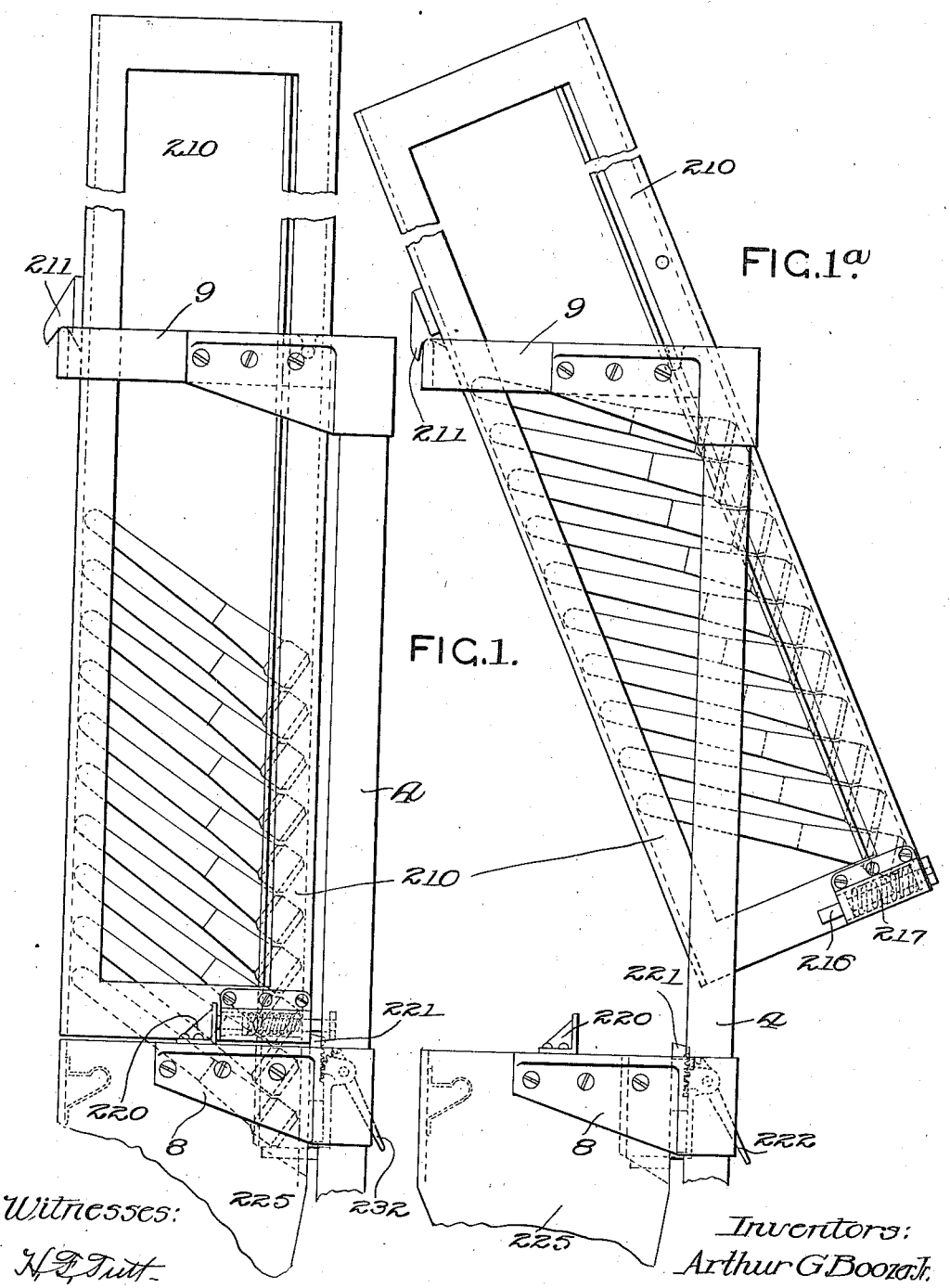
Figure 2:
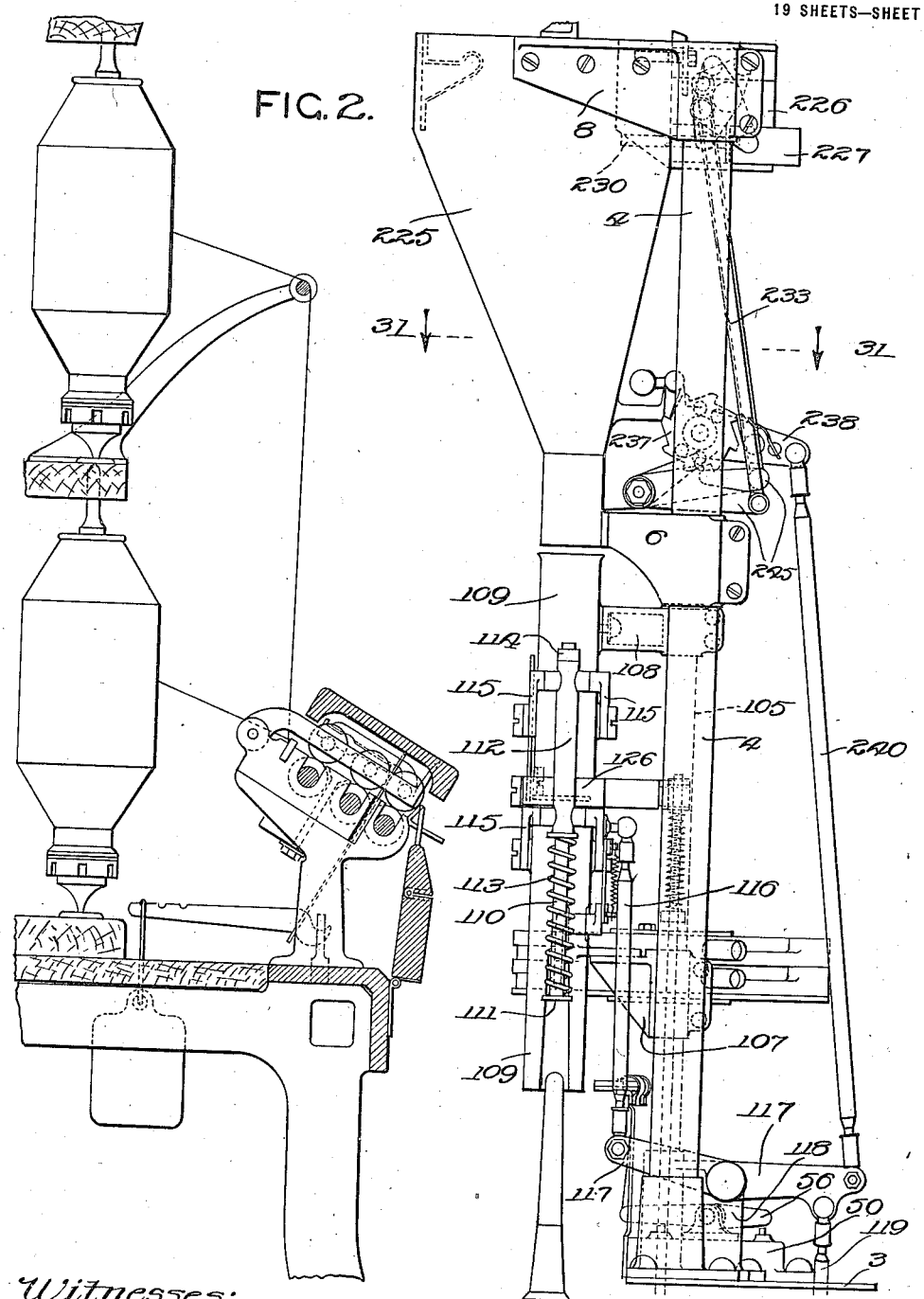
Figure 3:
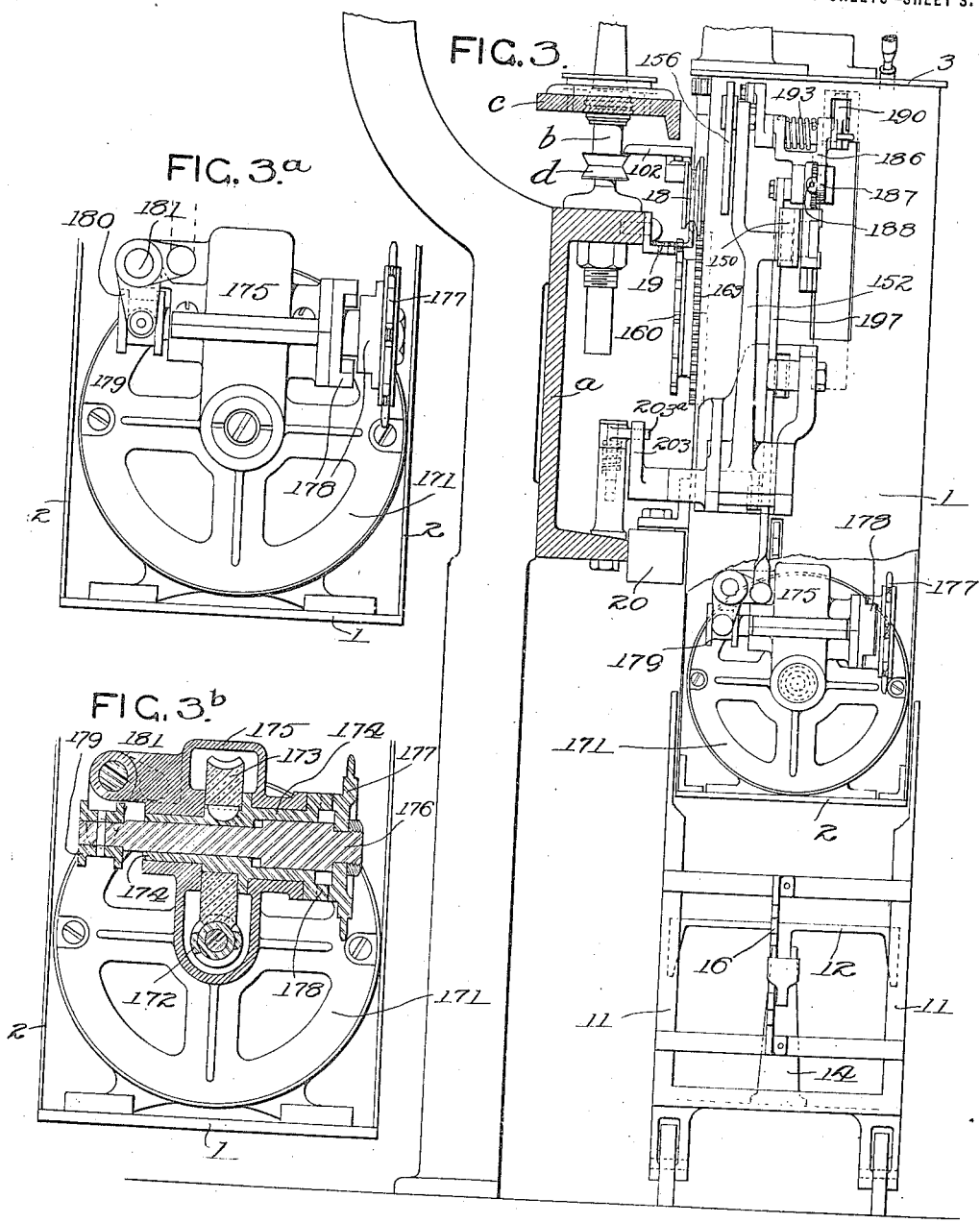
Figure 4:
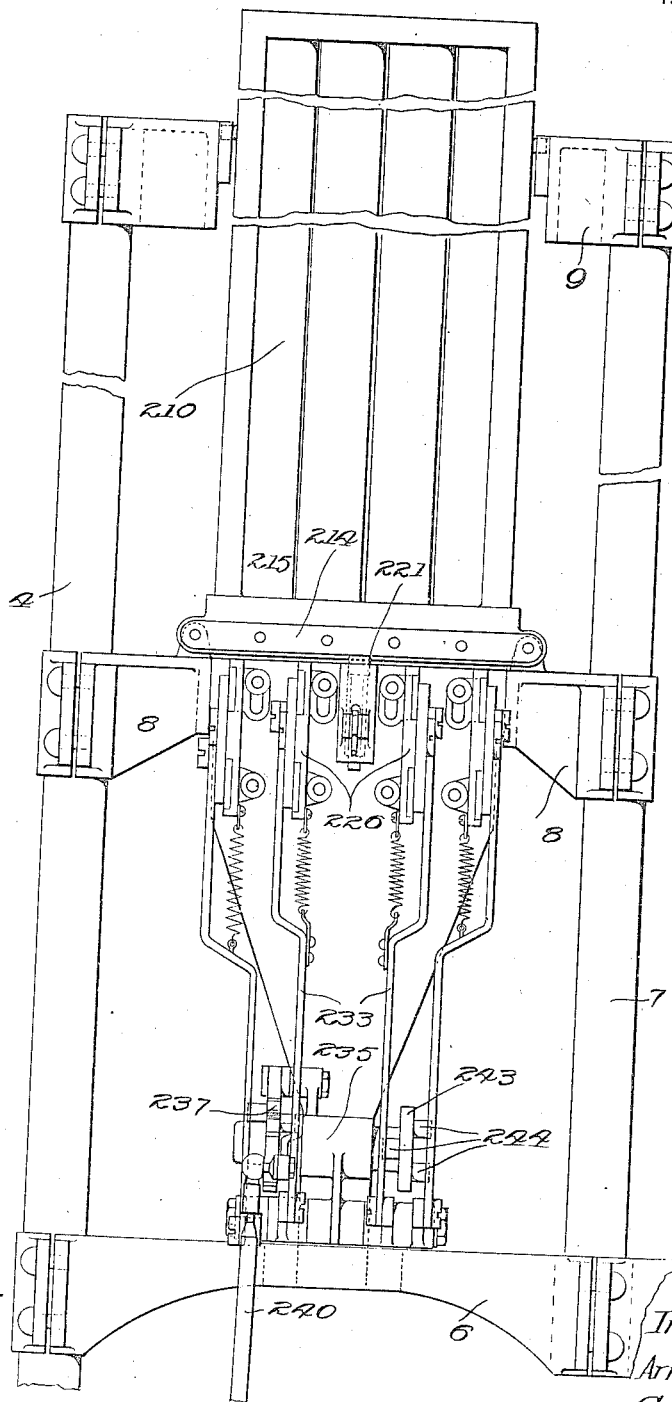
Figure 5:
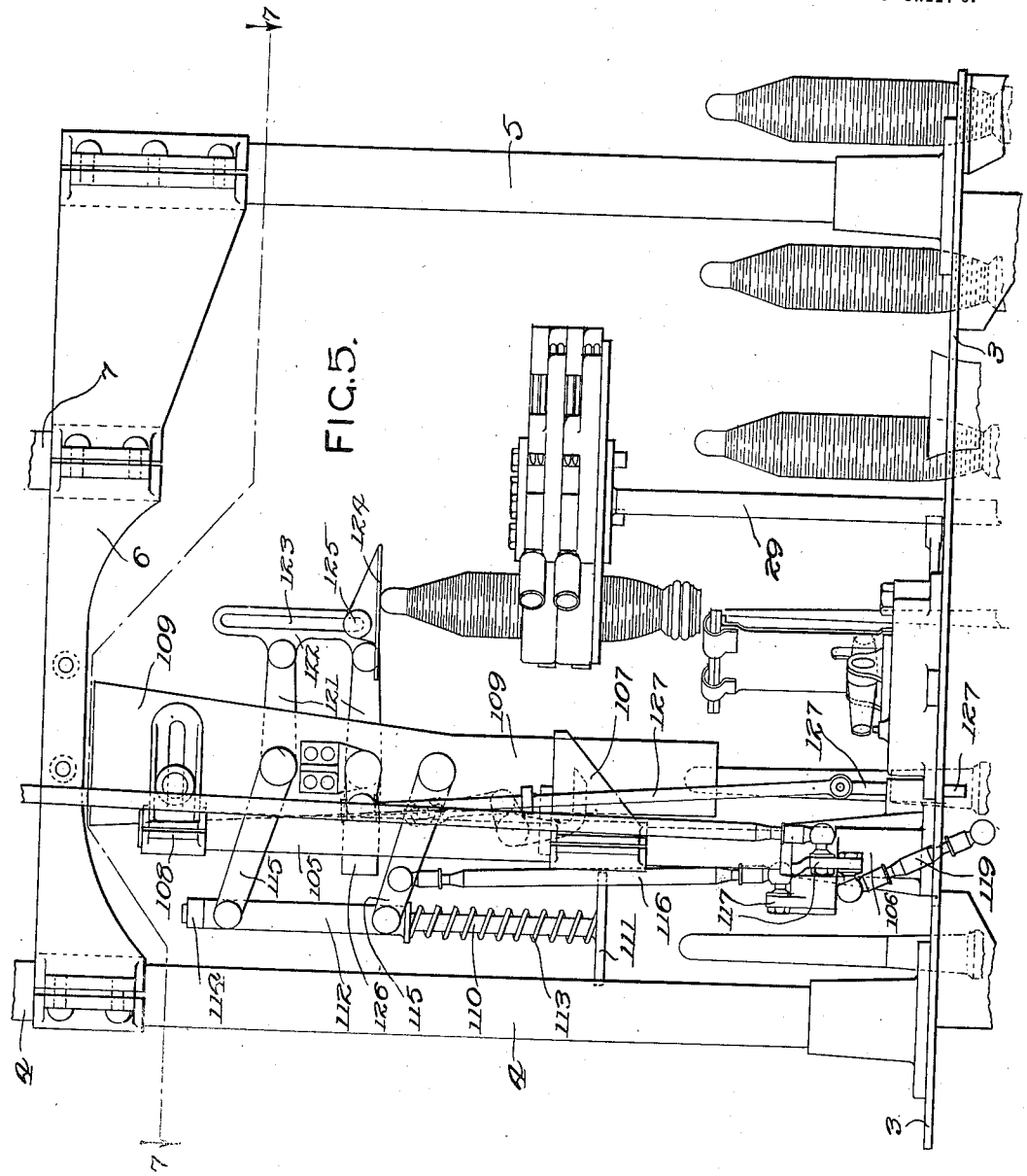
Figure 6:
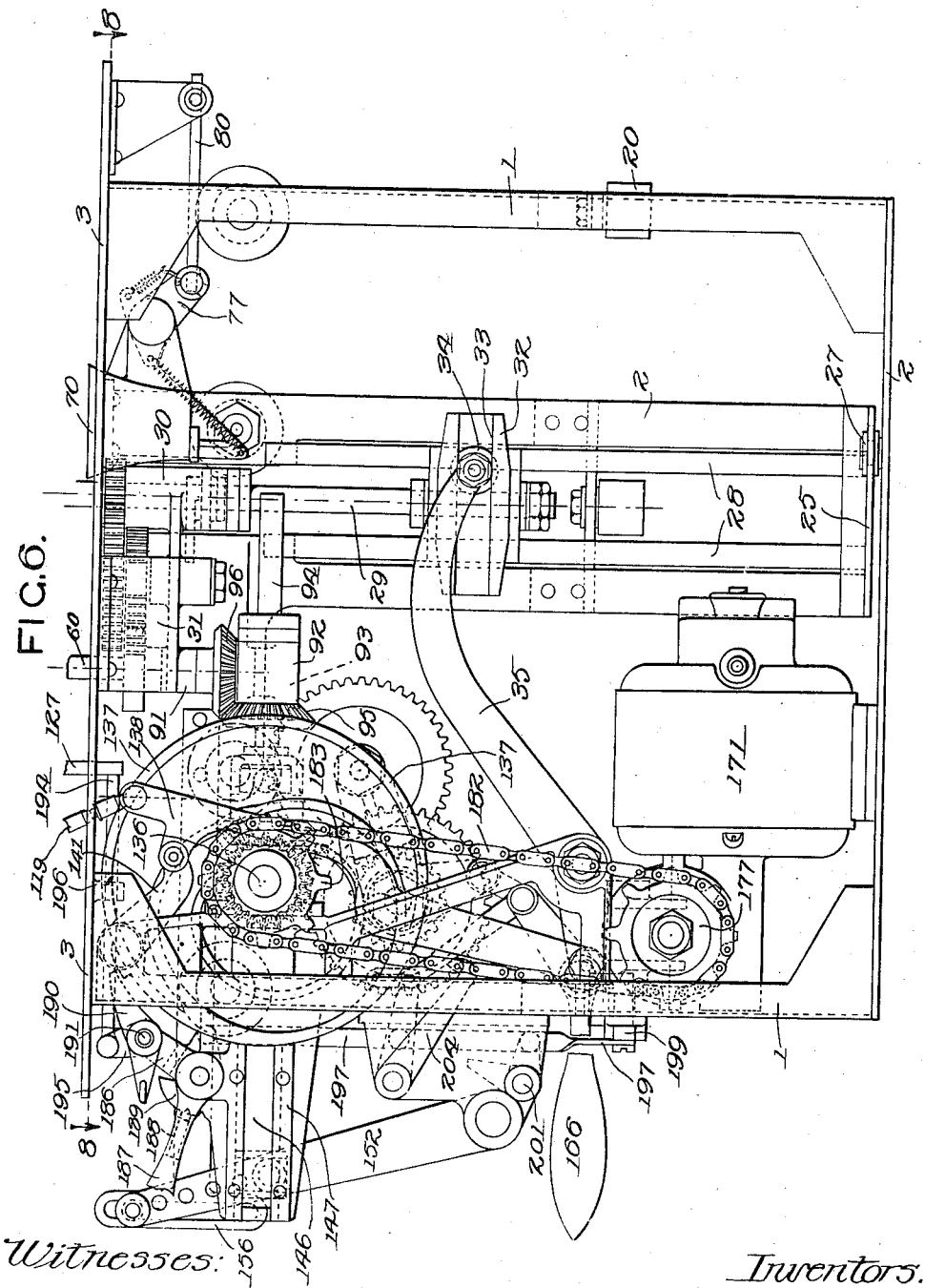
Figure 7:
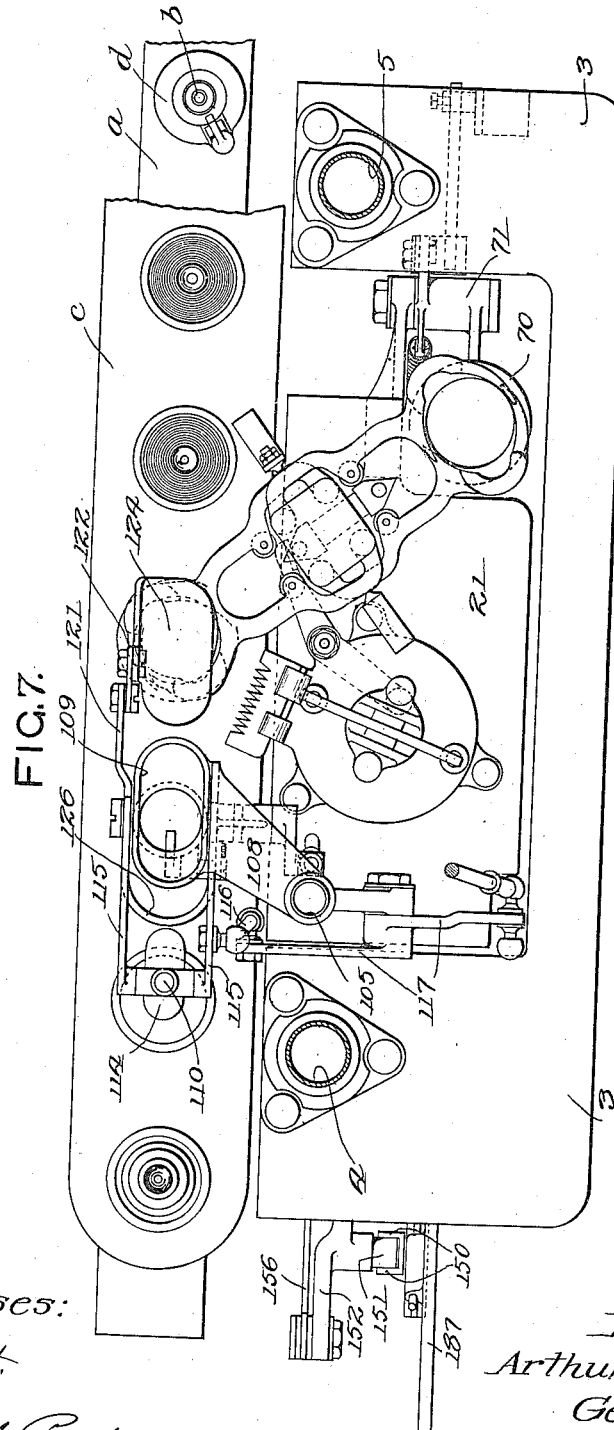
Figure 8:
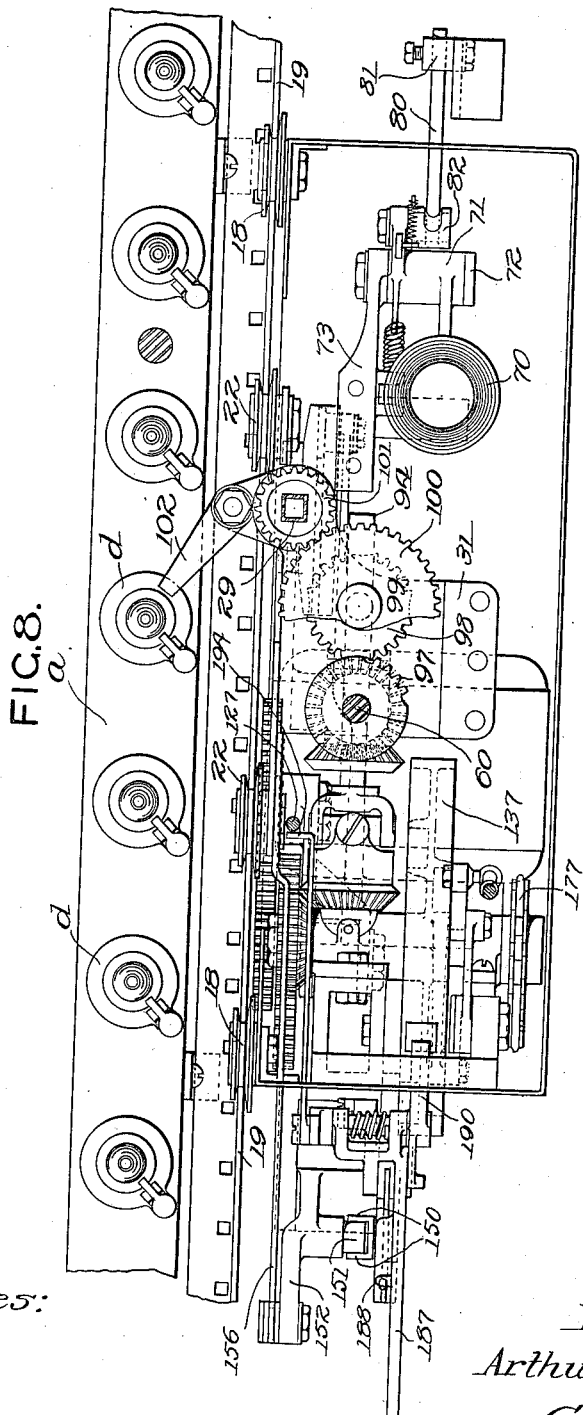
Figure 9:
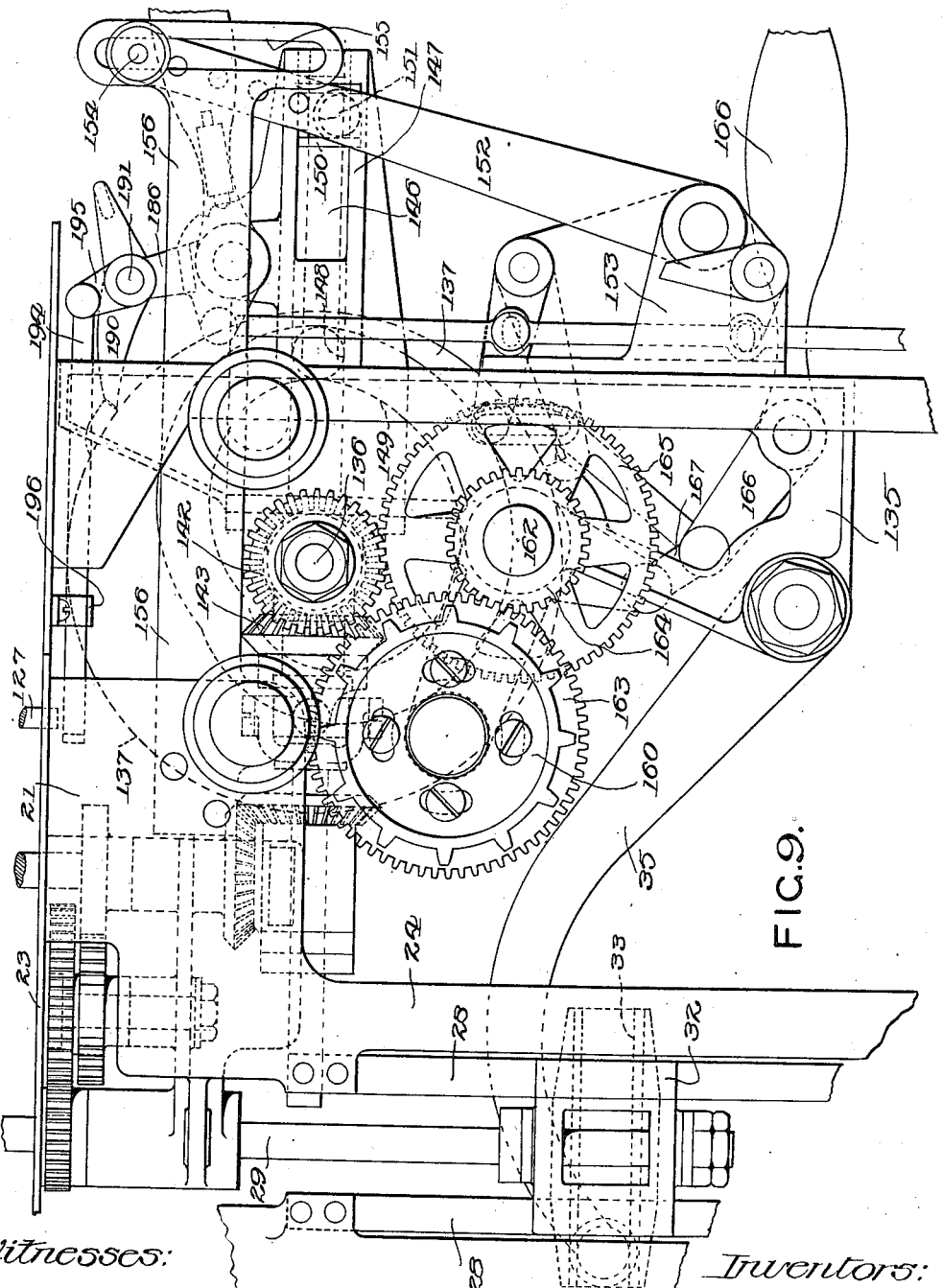
Figure 10:
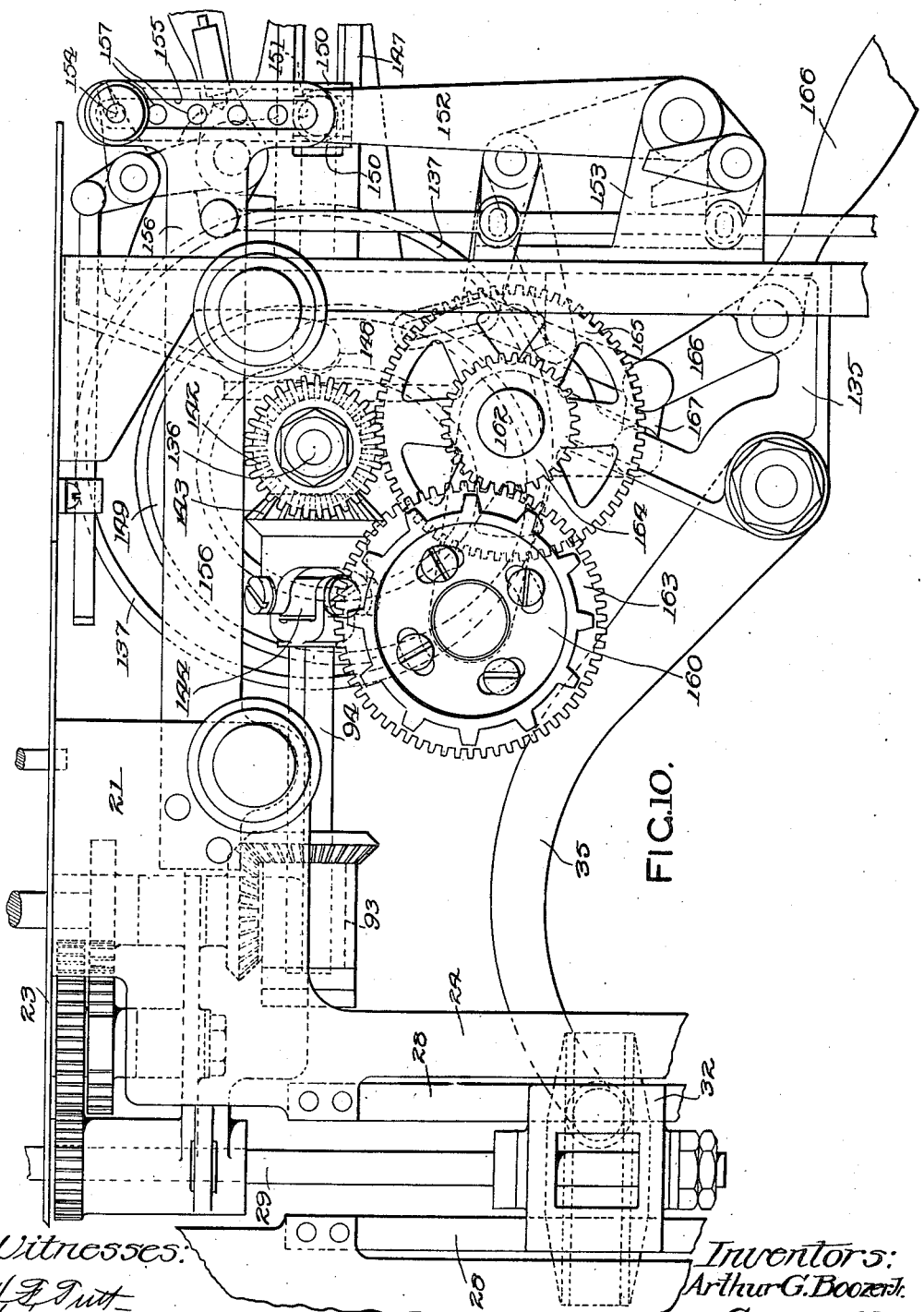

In the accompanying drawings, Figure 1 is a side elevation of the upper portion of a doffing machine embodying the features of our invention. Fig. 1$^a$ is a view similar to Fig. 1 showing the manner of mounting the magazine for empty bobbins. Fig. 2 is a side elevation of the middle portion of the doffer, the view also showing a part of a spinning frame. Fig. 3 is a side elevation of the lower portion of the doffing machine shown in operative relation to the spinning frame, the view also illustrating a truck which travels along with the doffer and upon which the doffer is supported when not in association with the spinning machine. Figs. 1, 2 and 3 are to be read together for a complete side view of the doffer. Figs. 3$^a$ and 3$^b$ are detail views illustrating the driving motor and a clutch associated therewith. Figs. 4, 5 and 6 together constitute a front elevation of the doffer, the supporting truck not being shown. Fig. 7 is a horizontal sectional view through the machine taken in the plane of line 7—7 of Fig. 5. Fig. 8 is a horizontal sectional view through the machine taken in the plane of line 8—8 of Fig. 6. Figs. 9 and 10 are fragmentary rear elevations of the lower portion of the doffer, illustrating the mechanism in two different positions. Fig. 11 is a fragmental sectional detail view illustrating the means for giving the doffer head a vertical reciprocating movement. Fig. 12 is a detail section on line 12—12 of Fig. 11. Fig. 13 is a section on line 13—13 of Fig. 11. Fig. 14 is a top plan view and Fig. 15 a side elevation of the doffer head. Fig. 16 is a detail view of one of the gripping fingers comprised in the doffer head. Figs. 17, 18 and 19 are respectively plan, rear elevation and sectional views illustrating the shearing mechanism and a portion of the means for opening and closing the jaws of the doffer head. Fig. 20 is a diagrammatic detail view illustrating the operation of the means for opening and closing the doffer head jaws. Fig. 21 is a front elevation of the truck for supporting the doffer when not in association with the spinning machine. Figs. 22, 22$^a$ and 23 are detail views showing the means for receiving a full bobbin from the doffer head and discharging it into the receptacle provided therefor. Figs. 24 and 25 illustrate a sensitive mechanism, which is operated when the doffer properly lifts a bobbin from a spindle, to control a throw-out device. Figs. 26 and 27 are detail views from the front side of the machine illustrating the bobbin seating means in two positions. Fig. 28 is a view from the left-hand side of Fig. 26. Fig. 29 is a section on line 29—29 in Fig. 26. Figs. 30 and 31 are fragmental sectional views illustrating the means for controlling the escape of empty bobbins from the magazine into the donning tube. Figs. 32 and 33 are respectively fragmental front and side elevations of said bobbin feed controlling mechanism. Figs. 34 and 35 are enlarged top plan views showing complementary halves of the magazine for empty bobbins. The bobbin-retaining means is shown in two different positions in these views.

In the embodiment of our invention, which we have herein shown by way of example, the framework of the main carriage of the machine comprises a lower portion having sides 1, a base plate 2, connecting the lower ends of said sides, and a table 3 mounted upon their upper ends. The upper portion of the main carriage frame work comprises a relatively long vertical standard 4 and a short standard 5 having their lower ends seated in socket members fixed to the table 3. A crosspiece 6 extends between the upper end of the short standard 5 and the longer standard 4. A third standard 7 has its lower end seated in the crosspiece 6 at a point inwardly from the short standard 5, and this third standard and the long standard are connected by crosspieces 8 and 9. When the doffer is not in association with the spinning frame it is supported by a truck, which also serves as a support for a receptacle 10 for the full bobbins (see Figs. 3 and 21). This truck comprises a framework 11 having rollers or casters to rest upon the floor, one end of the framework being constructed to support the bobbin receptacle 10. The rear portion of the truck frame has means for raising and lowering the doffer to assist in associating the latter with a spinning frame. The doffing machine rests upon a platform 12 which is guided in the truck for vertical movement, said platform being supported by one end of a hand lever 13 pivoted between its ends on a bearing bracket 14 upon the truck. The opposite end of said hand lever extends beyond the rear end of the truck and carries a dog 15 arranged to engage with a locking sector 16 fixed upon the truck frame. By means of this dog and sector, the doffing machine may be held at the desired elevation.

The main carriage of the machine is supported in operative relation to the spinning frame by means of a pair of grooved rollers 18 mounted upon the sides of the framework, said rollers running upon a guide rail 19 mounted on brackets secured to the upper flange of the bolster rail $a$ of the spinning machine. Said guide rail has rack teeth, or openings cut therein for the reception of teeth upon a driving wheel to be later described. Rollers 20 mounted on the sides 1 of the doffer frame bear against the lower flange of the bolster rail $a$, being held in engagement therewith by the weight of the doffer. The spindles of the spinning machine are indicated by $b$. $c$ is the ring rail of the spinning machine. The spindles $b$ have the usual whorls $d$ thereon. When the doffer is mounted on the spinning frame, the secondary carriage 21 (Fig. 7) is supported independently of the main carriage by means of grooved rollers 22 on the former running on the guide rail 19. The secondary carriage 21 comprises a top plate 23 level with the table 3 and a downwardly extending plate 24. At the lower end of the plate 24 is an angular bracket 25 (Fig. 6) which rests upon the base 1 of the main carriage when the doffer is not in association with the spinning frame. The bracket 25 has a slot into which a guide pin 27, fixed in the base 1, extends. The table 3 of the main carriage is cut away as indicated in Fig. 7 to receive the secondary carriage and permit the necessary reciprocation thereof. The lower portion of the vertical plate 24 carries guide rails 28 for guiding the doffer head in its vertical movement. The doffer head is carried upon the upper end of a vertical rod 29 (Fig. 6) slidably mounted in a bearing 30 forming part of a bearing casting 31 which is secured to the underside of the top plate 23 of the secondary carriage. The lower end of said rod is fixed to a crosshead 32 (Figs. 6 and 11) having grooved ends slidably engaging the guide bars 28. The outer side of the crosshead 32 has a horizontal undercut groove 33 therein to receive a roller stud 34 carried by one end of an oscillating lever 35. The means for oscillating the lever 35 to reciprocate the crosshead 32 will be presently described.

The doffer head proper (Figs. 14 to 16) comprises a base plate 38 suitably secured upon the upper end of the doffer rod 29, said base plate being shaped at opposite ends in the form of rings adapted to descend over the full bobbins on the spinning machine. Pivotally mounted upon vertical pins 39 fixed in the base plate 38 is a plurality of pairs of oppositely extending gripping fingers 40 which form two gripping devices at opposite ends of the doffer head. The fingers of each gripping device are alternately arranged so as to intermesh when closed, as clearly shown in Fig. 14. At their inner sides these fingers are provided with anti-friction rollers 41. (A top plate 42 is secured to the upper ends of the pins 39. A cam member 43, having wedge-shaped ends, is mounted to reciprocate between the sets of fingers, said cam member engaging the rollers in its reciprocation and spreading apart the fingers at one end of the doffer head and permitting the opposite fingers to be closed. Vertical pins 44, mounted in the ends of the wedge members 43, extend into guide slots 44ᵃ in the base plate 38 and the top plate 42 and guide the wedge member in its reciprocation. The lower ends of the pins 44 extend below the doffer head and are arranged to be alternately engaged by a lever to be presently described for reciprocating the wedge member. Each pair of fingers 40 are drawn toward each other by means of a bolt 45 extending through the fingers, said bolt having at one end a housing 46 within which is positioned a coiled spring 47, bearing at one end against the head of the bolt and at its other end against the housing; this spring acts to draw the two fingers, through which the bolt extends, toward each other. After a full bobbin has been raised off from its spindle by the doffer head, a shearing mechanism acts to sever the thread extending from the bobbin to its spindle. (See Figs. 5, 6 and 17 to 19). This shearing mechanism is constructed as follows: A housing 50 secured upon the top plate 23 of the secondary carriage, has secured to its forward side a bracket 51 having an angular upper end. A stationary shear blade 52 is fixed to said angular end and coöperates with a shear blade 53 slidably mounted upon the upper side of said stationary shear blade. A spring 54 secured to the bracket 51 acts to press the movable shear blade 53 against the stationary shear blade. A bell-crank lever 55 has one arm extending upwardly through slots in the end of the bracket 51 and in the stationary shear blade 52, said arm working in an opening in the slidable shear blade 53. A lever 56, pivoted between its ends upon lugs 57 on the housing 50, has one end connected by means of a link 58 with the bellcrank lever 55. Thus, when the lever 56 is rocked the shear will be operated. A cam member 59, fixed upon the upper end of a shaft 60 lies within the housing and has an arcuate cam portion 61 upon its upper side. A pair of pins 62, slidably mounted in bearings 63 in the housing 60, are arranged to be alternately raised and lowered by the cam portion 61, the upper ends of said pins underlying opposite ends of the lever 56 for rocking the latter.

A horizontal lever 64 pivoted at 65 between its ends upon the housing 50 has at one end a roller stud 66 which lies in a cam groove 67 upon the underside of the cam member 59. The opposite end of the lever 64 is arranged to engage the downwardly extending pins 44 on the doffer head for sliding the wedge member 43 to operate the gripping jaws. When the jaws of the doffer head open to drop the full bobbin contained therein, the bobbin falls endwise into a cup 70 (see Figs. 6, 22 and 23) which is fixed to a sleeve 71 rotatably mounted on a stub shaft 72 carried by a bracket 73, which depends from the top plate 23 of the secondary carriage. Normally the cup 70 rests upon a ledge 74 on the bracket 73 being held in this position by a coiled spring 75 secured at one end to a projection on the bracket and at its other end to a lug 76 upon the sleeve 71. A short arm 77, fixed to the sleeve 71, has a circular stud 78 at its outer end, said stud having a transverse opening 79 therethrough in which a pin 80 slides, said pin being adjustably fixed in a pivoted block 81 mounted on the main carriage frame. A sleeve 82 is rotatably fitted upon the stud 78 and has a slot 83 and an opening 84 therein at opposite sides through which slot and opening the pin 80 extends when the secondary carriage is adjacent to the right-hand side of the main carriage as viewed in Fig. 6. As the secondary carriage is drawn to the left (Figs. 22 and 23) with respect to the main carriage, the opening 84 in the sleeve is carried past the end of the pin 80 and at this time a spring 85 which is attached at its ends to a lug 86 on the cup sleeve 71 and a pin 87 on the sleeve 82, respectively, acts to rotate the sleeve to carry the opening 84 therein out of register with the end of the pin 80, as shown in Fig. 22. Now, when the secondary carriage begins its movement toward the left-hand side of the main carriage as seen in the mentioned figures the sleeve 82 engages the end of the pin 80 and prevents relative sliding movement between them. Therefore as the secondary carriage advances, the arm 77 will be held stationary and the cup 70 will be tilted upwardly to toss the bobbin contained therein over the side of the table 3 and into the full bobbin receptacle 10 carried by the truck. During the tilting movement of the cup, a small lug 88 upon the arm engages one end of a slot 89 formed in the sleeve 82 and rotates said sleeve to move the opening 84 therein into register with the end of the pin 80. When this point is reached, the spring 75 will act to draw the cup 70 downwardly, the pin 80 sliding through the opening 84 in the sleeve.

The casting 31 secured beneath the top plate 23 of the secondary carriage has a bearing 91 (Fig. 6) in which the shaft 60 runs and said casting further has a bearing 92 in which a horizontal sleeve 93 is rotatably mounted. The interior of said sleeve is non-circular to fit upon a non-circular driving shaft 94 mounted upon the main carriage. In the intermittent movement of the secondary carriage the sleeve 93 slides along said shaft and is constantly driven by the latter. The shaft 60 is driven from the sleeve 93 by intermeshing bevel gears 95 and 96. A gear member 97 (see Fig. 8) is fixed upon the shaft 60, said gear member having a plain periphery for the greater part thereof and being provided with a few gear teeth thereon. This gear member is arranged to coöperate with a gear member 98 rotatably mounted upon a stub shaft 99 carried in the bearing casting 31, the gear member 98 having four sets of teeth spaced about its periphery and adapted to intermesh with the teeth upon the gear member 97. Said gear member 98 also has four arcuate depressions alternating with its gear teeth, in which depressions the smooth peripheral portion of the gear member 97 is arranged to rotate between the times when the teeth of the two gears are brought into mesh. In this way the gear member 98 is given a series of quarter turns, one for each revolution of the gear member 97. A gear wheel 100 mounted upon the stub shaft 99 and rigid with the gear 98 meshes with a pinion 101 which has a non-circular opening fitting upon the correspondingly shaped reciprocating doffer rod 29. The relative dimensions of the gear 100 and the pinion 101 are such that the quarter turn imparted to the gear 100 will turn the pinion 101, and therefore the doffer head, through a half revolution, and this will occur once in each cycle of the machine, to wit, when the doffer head is in its uppermost position.

Referring to Fig. 8, 102 is a member arranged to overlie the whorl of the spindle being doffed to prevent the latter from being withdrawn in case the usual catch is broken. A vertical standard 105 (Fig. 5) has its lower end seated in socket member 106 fixed to the top plate of the secondary carriage. Said standard carries a pair of brackets 107 and 108, to the outer ends of which is secured a vertical donning tube 109 (see Figs. 2, 5 and 7) arranged to guide empty bobbins supplied thereto by mechanism to be later described, onto the successive spindles from which the doffer head has just removed full bobbins. After an empty bobbin has been dropped onto a spindle by the donning tube 109 the bobbin is pressed on its spindle by a bobbin seating device (see Figs. 2, 5 and 26 to 29) which comprises a vertical pin 110 carrying a plate 111 at its lower end, said pin being slidably mounted in a sleeve 112. A coiled spring 113 surrounds the pin 110 between the plate 111 and one end of the sleeve 112 and tends to move the pin downwardly, such movement being limited by a collar 114, fixed upon the upper end of the pin and stopping against the sleeve. Said sleeve is pivoted between two pairs of arms 115 arranged in parallel relation, one pair above the other, the other ends of said arms being pivoted to the donning tube 109. A link 116 has its upper end connected to one of the arms 115 of the lower pair, the lower end of said link being connected with a lever 117 (see Figs. 2 and 7) pivoted between its ends upon a lug 118 on the socket member 106. This lever is oscillated by a link 119 attached to mechanism to be later described. The ends of the links 116 and 119 preferably have universal connections with the respective parts to compensate for the varying movement of the parts.

A pair of arms 121, arranged in parallel relation (see Figs. 5, 24 and 25) are pivoted at one end to the rear side of the donning tube 109. The outer ends of the arms 121 are connected by a member 122 having a vertical slot 123 therein. A plate 124 is mounted upon the member 122 by means of a bolt 125 passing through the slot 123 whereby said plate may be adjusted vertically with respect to its mounting member 122. The lower one of the arms 121 has an extension 126 passing around to the forward side of the tube where it is pivoted. A link 127 is connected at its upper end to the extension 126 the lower end of the said link being jointed and being slidably guided in an opening in the top plate 23 of the secondary carriage. Preferably the connection between the link 127 and the arm 126 is yieldable, as indicated in Figs. 24 and 25; this connection may be made in any suitable way as by passing the link slidably through an opening in the arm and providing a coiled spring 128 bearing between said arm and a collar 129 on the link so that the link may yield upwardly. When the doffer head has properly engaged a full bobbin and raised the bobbin from its spindle the bobbin will engage and raise the plate 124, swinging the arms 121, and projecting the link 127 downward through the top plate of the carriage, as indicated in Fig. 24. In the travel of the secondary carriage this projecting lower end of te link is arranged to engage a device for throwing out a locking mechanism, which will be later described. Should the doffer head fail to properly raise a bobbin the link 127 will not be projected downwardly and the locking device above mentioned will operate to disconnect the mechanism from its driving means and stop the machine.

Figs. 26 to 29 illustrate a latch mechanism for holding a bobbin within the donning tube until the proper time for it to drop upon the spindle. This latch means comprises a dog 131 pivoted upon a lug on the donning tube and arranged to pass through a slot into the interior of the tube, as shown in Fig. 26. An arm 132, rigid with respect to the dog 131, is connected by a link 133 with one of the arms 115 of the bobbin seater, the connection between said link and said bobbin seater arm preferably being a pin and slot connection, as shown, to provide for lost motion. When the bobbin seater is drawn down, the dog 131 will be withdrawn at the proper instant to permit the empty bobbin to descend on its spindle.

The main actuating mechanism of the machine (see Figs. 6 to 10) is mounted on a bracket 135 secured to the inner face of one of the sides of the main carriage. A shaft 136, rotatably mounted in a bearing in said bracket, has fixed thereon a cam wheel 137 having cam grooves in both side faces thereof. The lever 35 for reciprocating the doffer head is pivoted in the lower portion of the bracket 135. Said lever is attached to the lower end of a link 138 (see Figs. 6 and 11) which has a roller stud 139 thereon running in a cam groove 140 in the forward side of the cam wheel 137. The upper end of this link is guided by an arm 141 pivoted to the bracket 135 and to the link 138. The link 138 is attached to the link 119, previously described, which rocks the lever 117. Upon the rear end of the shaft 136 is a gear wheel 142 (Figs. 9 and 10) having miter teeth on its forward face to engage with a miter gear 143 fixed upon the non-circular shaft 94 previously mentioned. Said shaft is rotatably mounted in the bracket 135 and has a universal joint 144 therein to accommodate the two vertical positions of the secondary carriage when the machine is on and off a spinning frame. A slide bar 146 mounted in a horizontal guideway 147 on one of the sides of the main carriage carries a roller stud 148 which runs in a cam groove 149 upon the rear face of the cam wheel 137. The outer end of the slide bar is provided with a pair of ribs 150 between which lies a roller stud 151 carried by an arm 152, said arm having its lower end pivoted in a bracket 153 mounted upon the outer side of the main carriage. The upper end of this arm 152 has a bolt 154 mounted therein which bolt extends through an elongated slot 155 in the free end of a bar 156 fixed to the secondary carriage. Preferably the arm 152 is provided with a plurality of openings 157 adapted to receive the bolt 154 so that the relative movement of these parts may be adjusted. As the main shaft 136 with its cam wheel 137 is rotated, the lever 35 is oscillated to reciprocate the doffer head, the non-circular shaft 94 is constantly rotated to drive the parts mounted on the secondary carriage, and the slide bar 146 is reciprocated to move the secondary carriage with reference to the main carriage.

The toothed wheel 160 which engages with the rack upon the doffer supporting rail for driving the doffer is mounted upon one arm of a bellcrank lever 161, (see Figs. 9, 10, 24 and 25) said lever being pivoted upon a shaft 162 mounted in the bearing bracket 135. A gearwheel 163 fixed with relation to the toothed driving wheel 160 meshes with a pinion 164 which is fixed to a gear wheel 165 rotatably mounted on the shaft 162. The latter gear wheel is driven from the pinion 142 upon the main actuating shaft 136. The bellcrank lever 161 is arranged to be swung to raise and lower the toothed driving wheel 160 into and out of operative relation to its rack on the guide rail 19 by means of a hand lever 166, pivoted in the bracket 135 and connected with one arm of said bellcrank lever through the medium of a short link 167. When the hand lever 166 is raised the center 168 of the pivot connecting it with the link 167 will swing beyond the center with respect to the bellcrank and the hand lever pivot so that the bellcrank will be held in its elevated position.

The embodiment of our invention which is herein disclosed, is arranged to be driven by an electric motor 171 mounted upon the base plate 1 of the main carriage. (See Sheet 3.) The armature shaft of this motor has a worm 172 thereon which meshes with a worm wheel 173 fixed upon a sleeve 174, said sleeve being rotatably mounted in a housing 175 carried by the motor. A shaft 176 is rotatably and slidably mounted within the sleeve 174 and has fixed upon one end thereof a sprocket wheel 177. Said sprocket wheel and the adjacent end of the sleeve 174 are provided with clutch faces 178 so that the wheel may be moved into and out of driving engagement with the sleeve. A grooved collar 179 fixed upon the other end of the shaft 176 receives a pair of roller studs carried by two arms 180 fixed on a rock-shaft 181, so that when said shaft 181 is rocked the clutch shaft 176 will be slid longitudinally to move the sprocket wheel 177 into and out of driving connection. A sprocket chain 182 (Fig. 6) runs about the wheel 177 and also extends over a sprocket wheel 183 fixed upon the main actuating shaft 136. A hand lever (not shown) may be fixed upon the forward end of the shaft 136 to drive the machine by hand.

In order to prevent breakage of the parts in case the doffer should fail to properly perform its functions, and also when the doffer reaches the end of the spinning frame, an automatic throw-out mechanism is provided for shifting the shaft 176 of the clutch means. (See Figs. 24 and 25.) A member 186 is pivoted upon the guideway 147, said member comprising a handle 187 having a spring locking dog 188 (Fig. 6) which engages in either of two notches in a stationary locking sector 189 upon the guideway. A dog 190, fixed on a shaft 191 mounted in this member, is adapted to run on the periphery of the cam wheel 137, said dog being engaged under certain conditions by a lug 192 on the wheel. A coiled spring 193 (Fig. 3) surrounding the shaft 191 tends to hold the dog against the wheel. A rod 194, having one end attached to an arm 195 which is fixed on the shaft 191, extends slidably through a bearing 196 beneath the table and is arranged to be engaged by the lower end of the depending link 127 (see Fig. 6) when the latter is projected downwardly, to raise the dog 190 and prevent its being engaged by the lug 192 on the cam wheel 137. A vertically extending link 197 has its upper end connected to a lug 198 on the member 186, the lower end of said link being attached to an arm 199 on the rock-shaft 181. When the link 197 is raised the clutch shaft 176 will be shifted to disengage the sprocket wheel 177 from its driving sleeve 174. A rock-shaft 201 mounted in the bracket 153 has fixed on its forward end an arm 202 which is attached to the link 197. The rear end of said rock-shaft has fixed thereon an upstanding arm 203 which is arranged to engage a yieldable stop arm 203ª (Fig. 3) mounted on the bolster rail $a$ at one end of the spinning frame. Thus the doffer will be stopped when it reaches the end of the frame. An arm 204 pivoted in the bracket 153 has a hooked end to engage the lug 192 on the periphery of the cam wheel 137. Another arm 205 fixed with relation to the arm 204 has a pin lying in a slot in one end of a link 206, the other end of said link being attached to the inner end of the hand lever 166.

In case the doffer head fails to remove a bobbin from its spindle or if the doffer head slips along the bobbin in removing it, the bobbin will not engage the plate 124 and the depending link 127 will not be projected below the top plate of the carriage (see Fig. 9). Therefore in the next reciprocation of the secondary carriage the rod 194 will not be slid and the dog 190 will be engaged by the lug 192 and the machine will be stopped.

By reason of the link 206 connecting the arm 205 with the hand lever 166 the clutch will always be thrown in when said hand lever is raised to engage the driving wheel 160 with its rack. The slot in the arm 205 permits independent movement between said arm and the hand lever 166.

The magazine 210 Figs. 1 and 1ª for empty bobbins comprises an enlarged rectangular case supported endwise in the machine by means of a hook 211 on one side thereof engaging with the cross-piece 9 at the top of the vertical standards. In placing a magazine in the machine the hook 211 is set upon the crosspiece 9 and the magazine is then swung downwardly in a vertical position in the manner indicated in Fig. 1ª. Mounted on two opposite walls within the casing are devices 212 (Figs. 34 and 35) which form a plurality of vertical channels 213 adapted to receive tiers of bobbins. In the present instance there are four tiers. The width of the magazine is made less than the length of a bobbin so that when the bobbins are placed in the channels 213 they will occupy a slanting position with their butts downward as shown in Figs. 1 and 33. The means for retaining the bobbins within the magazine comprises a bar 214 (see Fig. 34) having a plurality of pins 215 extending through the wall of the magazine and adapted to enter the openings in the lowermost row of bobbins. The bar 214 is supported by a pair of rods 216 slidably mounted in housings 217 secured to the outer sides of the magazine at its lower end. Coiled springs 218 surround the rods 216 within the housings 217, said springs bearing against the housings and shoulders 219 on the rods and tending to hold the bar 214 against the magazine with the pins 215 in operative position. The free ends of the rods project beyond the housings 217 and are adapted to be engaged by a pair of stops 220 fixed on the crosspiece 8 as the magazine is swung downwardly when being mounted in place (see Fig. 1ª). The engagement of the rods with the stops 220 moves the bar 214 away from the magazine and withdraws the pins from the lower row of bobbins therein thus permitting the bobbins to settle. When the magazine is in a vertical position, a locking dog 221, slidably mounted on a guide tube beneath the magazine, will spring up to engage the lower edge of the magazine and hold it in place. In the present instance said locking dog has rack teeth thereon with which a sector lever 222 engages for sliding the dog 221 downwardly against the action of coiled springs 223 (see Fig. 32.)

A funnel-shaped guide tube 225 is permanently mounted on the crosspiece 8 and is adapted to direct bobbins from the magazine into the donning tube 109. The upper end of the donning tube is preferably flared so as to remain in register with the guide tube 225 during the reciprocation of the secondary carriage. Mounted upon the forward side of the guide tube is an escapement mechanism adapted to permit bobbins to fall one at a time. This mechanism comprises a plurality of brackets 226 (Fig. 32) equal in number to the number of tiers of bobbins, said brackets being secured to the guide tube 225 near its upper end. In each of said brackets is a pair of guideways located one above the other and in these guideways is mounted a pair of slides 227 having angular lugs 228 at their forward ends which travel in slots 229 in the brackets. Fixed to the lug 228 on each of the slides is a pin 230 which is arranged to slide through an opening in the walls of the guide tube and engage bobbins therein. The two slides on each of the brackets are arranged to be alternately moved toward and away from the guide tube by means of a lever 231 pivoted at 232 upon the bracket and loosely connected at its ends to the slides 227. Links 233 each attached at its upper end to one of the levers 231 are movable by means to be presently described for operating the slides. Springs 234 attached to the links 233 tend to hold said links in their uppermost position, when the lower pin 230 of each pair will be projected into the guide tube to support its tier of bobbins and the upper pin will be withdrawn from said tube. As one of the links 233 is drawn downwardly the lower pin will be withdrawn from the guide tube to permit the lowermost bobbin of the tier supported thereby to descend into the donning tube, and at the same time the uppermost pin will be projected into the opening in the next bobbin above to support the remainder of the tier of bobbins. The pairs of slides 227 are operated in consecutive order to permit the lowermost bobbin in the several tiers to be successively dropped.

Mounted on the guide tube 225 beneath the series of brackets just described, is a bearing bracket 235. A shaft 236 mounted in said bracket has a ratchet wheel 237 fixed thereon and upon said shaft along side of said ratchet wheel is pivoted an arm 238 having a pawl 239 thereon which engages the ratchet wheel. The arm 238 is arranged to be swung by means of a link 240 attached to said arm, the lower end of said link being attached to the lever 117 previously described (see Fig. 2). A locking dog 242 prevents backward movement of the ratchet wheel 237. Upon the other end of the shaft 236 is fixed a disk 243. On each side of the ratchet wheel 237 and the disk 243 is mounted a pair of diametrically opposite studs 244, the positions of the four pair of studs being spaced equally about the center of said ratchet wheel and disk as indicated in Fig. 33. A series of arms 245 are pivoted in the bracket 235 beneath the ratchet wheel and the disk, the free ends of said arms being attached to the operating links 233. Each of said arms 245 has a lug 246 adapted to be engaged by two studs 244 upon one side of the ratchet wheel 237 or the disk 243. Owing to the arrangement of said studs the arms 245 will be consecutively swung twice for each rotation of the shaft 236. In the present embodiment of this mechanism there being four tiers of bobbins in the magazine 210 four arms are provided. The ratchet wheel 237 has eight teeth thereon and is moved a distance of one tooth at each oscillation of the arm 238. Said arm is oscillated once every time the doffer head is raised by the lever 35; and at each oscillation of said arm one of the said studs 244 will be brought into position to lower one of the arms and thus permit a bobbin to drop into the donning tube. Briefly stated, the escapement mechanism is operated every time a full bobbin is lifted off the spindle.

When the spinning frame is ready to be doffed the supporting truck of the doffing machine is pushed alongside said frame and the lever 13 is operated to raise the doffing machine so that the supporting-rollers 18 and 20 may be engaged with the supporting-rails on the spinning frame. The bobbins on the first two spindles are doffed by hand, and an empty bobbin is placed by hand on the first spindle. The mechanism of the doffing machine is set in its initial position with the doffer head elevated above the third spindle and ready to descend about the bobbin thereon. The driving wheel 160 is then raised into mesh with the rack-bar on the spinning frame, and said driving wheel is clutched to the motor 171. As the actuating shaft 36 starts to rotate, the cam 137 will cause the link 138 to rise, thereby swinging the lever 35 and lowering the doffer head and also swinging the lever 117 to lower the bobbin-pressing device 110—111, said bobbin-pressing device in its descent engaging the bobbin on the first spindle of the spinning frame, which bobbin had been placed thereon by hand. The upward movement of the cam-driven link 138 also acts through links 119 and 240 to actuate the escapement mechanism and permit an empty bobbin to descend from the magazine into the donning tube, said bobbin being arrested by the inwardly projecting dog 131. The doffer head having been actuated to grasp the bobbin on the third spindle, continued rotation of the cam 137 causes the doffer head to rise, thereby removing the bobbin from the spindle. The bobbin-pressing device is also raised and in its movement withdraws the retaining dog 131 from the donning tube, thereby permitting the empty bobbin supported thereon to descend onto the empty second spindle of the spinning frame. During the time that the doffer head and the bobbin-pressing device are descending and rising the secondary carriage is stationary with relation to the spinning frame, while the main carriage is advancing steadily, the sliding connection between the non-circular shaft 94 and the sleeve 93 permitting of this movement of the carriages. When the doffer head is in its extreme upper position, the secondary carriage will be given a quick advancing movement the distance between two spindles through the medium of the cam groove 149, the slide 146, the arm 152, and the bar 156, which bar is attached to the secondary carriage. The doffer head and the bobbin-pressing device now descend, and a cycle of operations similar to that just described is again performed. The main carriage travels at a constant speed along the spinning frame while the secondary carriage travels intermittently, stopping before each spindle, while the doffing, donning and bobbin-seating operations are taking place. The full bobbins on the spinning frame are thus successively doffed and empty bobbins supplied to the spindles and pressed thereon.

While we have herein described the present embodiment of our invention in considerable detail, we recognize that various modifications may be made within the scope of our invention and therefore do not limit ourselves to the construction shown and described.

We claim as our invention:

1. A doffing machine comprising two relatively movable carriages arranged to be individually supported upon a guide rail independently of each other, and doffing means carried by one of said carriages.

2. A doffing machine comprising two carriages arranged to be individually supported upon a guide rail for relative movement, means for giving one carriage a continuous traveling movement and the other carriage an intermittent movement; and doffing means carried by the intermittently moving carriage.

3. A doffing machine comprising two carriages arranged to be individually supported upon a guide rail for relative movement, one of the carriages being adapted to support the other when the machine is not in association with said guide rail; means for giving one carriage a continuous traveling movement and the other carriage an intermittent movement; and doffing means carried by the intermittently moving carriage.

4. A doffing machine comprising a main carriage; a secondary carriage adapted to be supported on a spinning frame independently of said main carriage; doffing means carried by said secondary carriage; mechanism mounted upon the main carriage for giving a continuous movement to the main carriage and an intermittent movement to the secondary carriage; mechanism mounted on the secondary carriage for actuating said doffing means; and an operative connection between the two last mentioned mechanisms.

5. A doffing machine comprising a main carriage; a secondary carriage adapted to be supported on a spinning frame independently of said main carriage; a reciprocatory doffer head mounted on the secondary carriage; means on the secondary carriage for rotating said doffer head; mechanism on the main carriage adapted to give a continuous movement to the main carriage and an intermittent movement to the secondary carriage and adapted to reciprocate said doffer head; and a shaft driven from said mechanism and having a slidable and non-rotatable connection with said doffer-head-rotating means.

6. A doffing machine comprising a carriage adapted to be mounted upon a track; means for propelling said carriage continuously; a second carriage adapted to be mounted upon said track independently of the first carriage; means actuated by said propelling means for moving the second carriage intermittently; doffing means mounted on said second carriage; and coöperative means on said carriages adapted to be engaged when the carriages are detached from the track for supporting one of the carriages through the medium of the other.

7. A doffing machine comprising a main carriage having supporting rollers on its rear side; a secondary carriage having supporting rollers adapted to run upon a guide rail and support the secondary carriage independently of the main carriage when the doffer is in association with a spinning frame; means for giving the main carriage a continuous traveling movement and the secondary carriage an intermittent movement; and doffing means mounted upon said secondary carriage.

8. In a doffing machine, a doffer head comprising spring pressed bobbin engaging fingers; a reciprocable wedge member adapted to spread such fingers apart, said wedge member having a projection extending below the doffer head; and means beneath the doffer head arranged to engage said projection for reciprocating said wedge member.

9. In a doffing machine, a doffer head comprising two oppositely extending gripping devices consisting of spring pressed fingers; a reciprocable wedge member adapted alternately to spread the fingers of said gripping devices apart, said wedge member having two projections extending below the doffer head; and means beneath the doffer head arranged to alternately engage said projections for reciprocating said wedge member.

10. In a doffing machine, in combination, two relatively movable carriages; doffing means and a tiltable bobbin-receiving device on one of said carriages; and means operable in the relative movement of said carriages for tilting said device to discharge bobbins therefrom.

11. In a doffing machine, in combination, doffing means; and a tiltable device to receive bobbins from said doffing means and discharge said bobbins into a receptacle therefor.

12. In a doffing machine, in combination; two relatively movable carriages, doffing means and a tiltable bobbin-receiving device mounted on one of said carriages; a member on the other carriage; and means on said bobbin-receiving device adapted to slide along said member in one movement of the carriage and adapted to interengage therewith in another movement to tilt said device and discharge bobbins therefrom.

13. In a doffing machine, in combination, doffing means; a receptacle for doffed bobbins; and means beneath the doffing means adapted to receive a bobbin from said doffing means, said bobbin-receiving means being movably mounted and being adapted to transfer the bobbins into said receptacle.

14. In a doffing machine, in combination, two relatively movable carriages; doffing means on one of said carriages and a receptacle for doffed bobbins on the other carriage; and means mounted for movement on the carriage having the doffing means and adapted to receive a bobbin from said doffing means and transfer it to said receptacle.

15. In a doffing machine, means for doffing bobbins, and means for severing the thread thereon comprising a stationary shear blade, a shear blade slidable on said stationary blade and having an opening therein; a lever working in said opening, and means for swinging said lever to operate the shear.

16. In a doffing machine, means for doffing bobbins; and means for severing the thread thereon comprising two relatively slidable shear blades, a lever for sliding one of said blades, a rotary cam, a lever operable thereby, and a link connection between said levers.

17. In a doffing machine, means for doffing bobbins; and means for severing the thread thereon comprising two relatively slidable shear blades, a bell-crank lever engaging one of said blades for sliding it, a rotary cam, a lever pivoted between its ends; pins operable by said cam for rocking the last mentioned lever; and a link connecting said levers.

18. In a doffing machine, a yieldable device for pressing bobbins onto spindles, a pivoted arm upon which said device is carried, and means for swinging said arm to carry said presser device downwardly.

19. In a doffing machine, a pair of pivoted arms arranged in parallel, a yieldable device carried upon the free ends of said arms and adapted to press bobbins into spindles, and means for swinging said arms to move said device downwardly.

20. In a doffing machine, in combination, doffing means, throw-out mechanism, and means operable by a properly doffed bobbin for preventing actuation of said throw-out mechanism.

21. In a doffing machine, in combination, doffing means, driving means, means for disengaging said doffing means from said driving means, and means operable when a bobbin is properly doffed for preventing operation of said disengaging means.

22. In a doffing machine, in combination, doffing means; driving means, means for disengaging said doffing means from said driving means, and means adapted to be engaged by a bobbin held in said doffing means for preventing actuation of said disengaging means.

23. A magazine for bobbins comprising a rectangular case having means at opposite sides providing a series of pairs of vertical guideways for opposite ends of vertical tiers of bobbins, the guideways of each pair being parallel and being positioned apart a distance less than the length of a bobbin, whereby the bobbins are held in a slanting position, and withdrawable means to engage the lower end of the lowermost bobbin in each tier for normally holding the bobbins in the magazine.

24. A bobbin magazine for doffers comprising a case having vertical guide channels therein, the width of said case being less than the length of a bobbin, whereby the bobbins are held in a slanting position with their butts downward, and means mounted on the lower end of the magazine and comprising a series of pins adapted to enter the openings in the lowermost row of bobbins for normally supporting the bobbins in the magazine.

25. A bobbin magazine for doffers having means thereon for preventing the escape of bobbins, said means being arranged to be automatically withdrawn by a part on the doffing machine when the magazine is placed on said machine.

26. In a doffing machine, a magazine for empty bobbins having a plurality of vertical channels therein, spring pressed means at the lower end of said magazine arranged to engage the lowermost row of bobbins, and means on the doffing machine to withdraw said spring pressed means when the magazine is associated with the doffing machine.

27. In a doffing machine, a magazine for empty bobbins comprising a case having a series of vertical channels therein, the width of the case being less then the length of a bobbin whereby the bobbins are disposed in a slanting position; two sliding rods mounted at the lower end of the magazine, a bar connecting said rods, a series of pins mounted in said bar and adapted to project into the magazine and enter the openings in the lowermost row of bobbins, spring means for holding said pins inwardly, and means on the doffer to engage said rods and withdraw said pins from the magazine.

28. In a doffing machine, a slide for supporting a tier of bobbins, a second slide adapted to engage the next adjacent bobbin when the first slide has been withdrawn to permit the lowermost bobbin to drop, and means for operating said slides.

29. In a doffing machine, means for supporting a vertical tier of bobbins with the bobbins in a slanting position, a pair of slides mounted one above the other, the lowermost slide being arranged to lie beneath the bottom bobbin of the tier and the upper slide being arranged to enter the hole in the end of the next adjacent bobbin when the lower slide is withdrawn, and means for operating said slides.

30. The combination with a spinning machine having a rack mounted thereon, of a doffer arranged to be supported to travel along said rack, a toothed wheel meshing with said rack, a pivoted lever upon which said wheel is mounted for movement into and out of engagement with said rack, and means for driving said wheel.

31. The combination with a spinning machine having a rack mounted thereon, of a doffer having a toothed propelling wheel adapted to mesh with said rack, said wheel being mounted to move into and out of engagement with said rack, driving means, and means for simultaneously moving said wheel into mesh with said rack and for connecting said wheel with said driving means.

In testimony whereof we affix our signatures in the presence of two witnesses.

ARTHUR GEORGE BOOZER, Jr.
GEORGE HILL.

Witnesses:
S. B. Moore,
Z. E. Collins.